March 12, 1963  M. MABRU ETAL  3,080,736
PROCESS AND APPARATUS FOR THE MANUFACTURE OF
WICKS OR THREADS FROM THERMOPLASTIC
MATERIALS SUCH AS GLASS
Filed Feb. 21, 1961  3 Sheets-Sheet 1

INVENTORS
MARCEL MABRU
PAUL PIOT

BY Albert L. Krey
ATTORNEY

March 12, 1963

M. MABRU ETAL 3,080,736

PROCESS AND APPARATUS FOR THE MANUFACTURE OF
WICKS OR THREADS FROM THERMOPLASTIC
MATERIALS SUCH AS GLASS

Filed Feb. 21, 1961

INVENTORS
MARCEL MABRU
PAUL PIOT

BY Albert L. Krey

ATTORNEY

March 12, 1963
M. MABRU ETAL
3,080,736
PROCESS AND APPARATUS FOR THE MANUFACTURE OF
WICKS OR THREADS FROM THERMOPLASTIC
MATERIALS SUCH AS GLASS
Filed Feb. 21, 1961
3 Sheets-Sheet 3
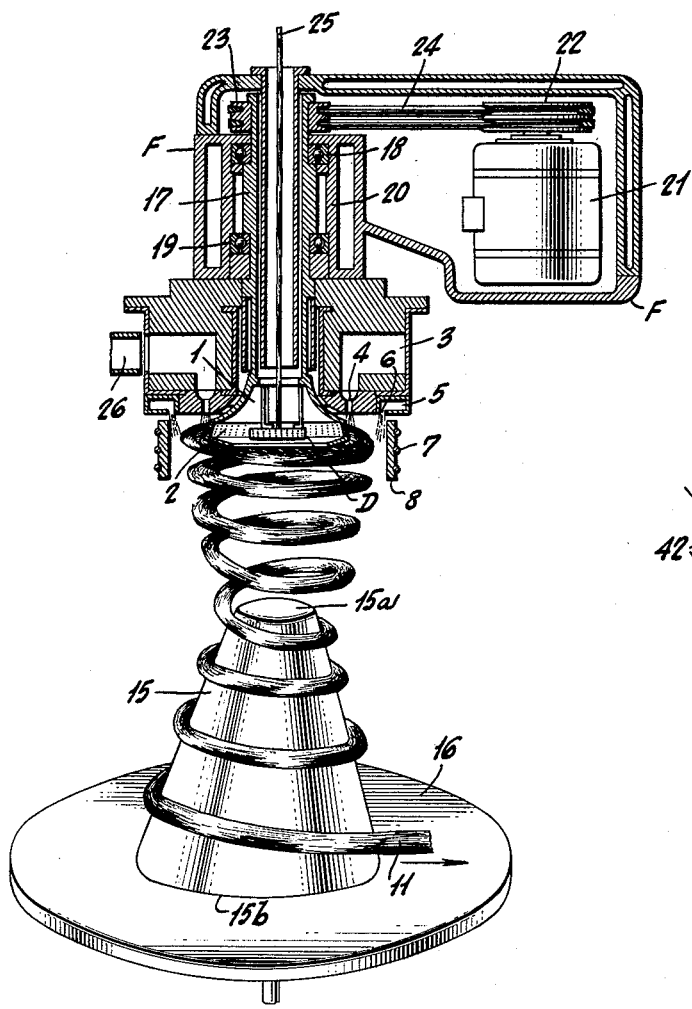
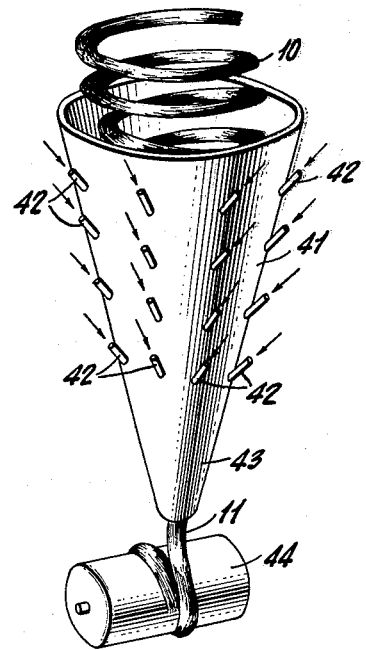
INVENTORS
MARCEL MABRU
PAUL PIOT
BY Albert L. Krey
ATTORNEY

United States Patent Office 3,080,736
Patented Mar. 12, 1963

3,080,736
PROCESS AND APPARATUS FOR THE MANUFACTURE OF WICKS OR THREADS FROM THERMOPLASTIC MATERIALS SUCH AS GLASS
Marcel Mabru, Paris, and Paul Piot, Deuil, Seine et Oise, France, assignors to Compagnie de Saint-Gobain, Neuilly-sur-Seine, France, a corporation of France
Filed Feb. 21, 1961, Ser. No. 90,776
Claims priority, application France Feb. 25, 1960
16 Claims. (Cl. 65—8)

The object of the present inventiton is to develop a process and apparatus for the manufacture of wicks or threads from mineral or organic materials in the viscous state, and in particular, the instant invention relates to the production of glass wicks or threads. The invention, more especially, concerns a process according to which fibers are obtained by action of centrifugal force by introducing the melted material into the interior of a hollow rapidly rotating centrifuge body provided with orifices in its periphery. The material is projected through the orifices under the action of centrifugal force in the form of streams or filaments, which are subjected to a drawing-out operation to transform them into fibers.

This process gives rise to a collection of the fibers which are evacuated below the rotary centrifuge as they are discharged from the orifices in the peripheral wall of the latter, in the form of a spiral of increasing closeness. Since the speed of evacuation of these spirals decreases rapidly under the centrifuge, the fibers group themselves practically in a mass that is perceptibly tubular and continuous.

The invention makes possible the production of wicks or threads of very uniform characteristics and good mechanical resistance from the fibers issuing from orifices of the rotating body or centrifuge.

The process according to the invention consists in subjecting the fibers to an acceleraiton causing a progressive increase in speed which is continued until the mass of fibers is transformed into a wick or thread. This progressive acceleration communicated to the mass of fibers has the effect, on the one hand, of separating the spirals from one another as they are formed upon leaving the rotating body, and on the other hand, of subjecting the fibers to an action contributing to the formation of the wick or cord.

According to one method of putting the invention into operation, the mass of fibers is brought into contact with mechanical supports communicating a progressively increasing speed to the said mass. These supports may assume the form of cylindrical rollers disposed in parallel, spaced from each other, and rotating at successively increasing speeds.

According to another arrangement, the mass of fibers may be brought into contact with annular surfaces placed in succession to one another, with the peripheral speed of the successive different surfaces increasing progressively.

Instead of a pulrality of elements acting successively upon the mass of fibers, only one may be utilized, operated by a movement of rotation, and whose form is such that its peripheral speed is progressively increased. In particular, an element of conical form rotating about its axis, may be utilized.

According to another mode of execution of the invention, the mass of glass fibers is subjected to the action of pneumatic means which communicates a progressively increasing speed to said mass.

The invention particularly makes provision for subjecting the mass of fibers to the action of a plurality of blower elements arranged in succession to one another, and producing gas jets of increasing speed.

The effect of these pneumatic means may be increased by channeling the gas jets and the fibers at the same time to the interior of a hollow body, particularly of general conic form.

The cords or threads obtained by the process according to the invention may be conducted toward any suitable means to effect the winding thereof.

Hereinafter are described, by way of illustration and not as limiting examples, several modes of execution and realization of the invention, with reference to the attached drawings, wherein FIG. 1 is a perspective view, with certain parts in section, of one embodiment of the invention;

FIG. 3 is a vertical sectional view of the centrifuging apparatus, with certain parts in elevation, in combination with still another embodiment for progressively accelerating the travel of the spirals of fibers beyond the centrifuging machine;

Figure 7:
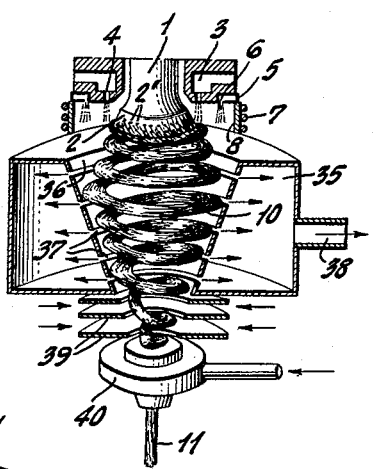

FIG. 7 is a vertical sectional view of a combined mechanical and pneumatic guide for the spirals to effect a gradual conversion of the spirals into the form of a continuous straight thread or wick of fibers; and FIG. 8 is a perspective view of a combined mechanical funnel and pneumatic blowing means for guiding the spirals of fibers from below the centrifuge and transforming them into the form of a wick or thread of fibers for winding upon a bobbin.

In the illustrated embodiments, the devices according to the invention are provided in conjunction with apparatus for manufacturing fibers which comprises a hollow centrifuge body 1, rotating about its axis at high speed, and provided with a peripheral band or wall 2 fitted with rows of projection orifices 2' through which the melted material, introduced into the centrifuge, is projected in the form of filaments. A combustion chamber 3 of general annular form, is provided with an expansion orifice 4 of corresponding outline, and combustion gases of high speed and temperature are directed therethrough, which come into contact with the filaments of material as they are projected from centrifuging body 1, or a short distance therefrom. An annular blower 5 with a continuous slot 6 or closely spaced orifices, is also provided, through which emerge the gaseous jets acting on the filaments of material.

In order to maintain the peripheral wall 2 at a suitable temperature, induction heating may be provided by a winding 7 traversed by a high-frequency current, which winding may be mounted on an annular support 8.

Figure 1:
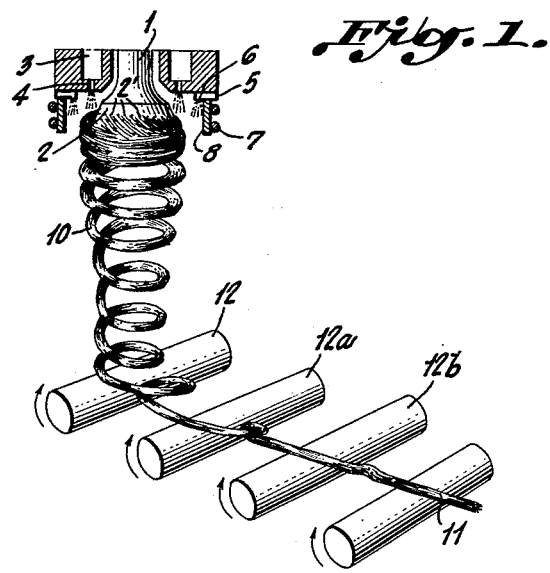

The filaments of molten material are attenuated by the combustion gases and blower jets and are evacuated below the centrifuge in the form of spirals 10, as shown in FIG. 1 as well as the remaining figures.

In the form of execution of the invention shown in FIG. 1, the device comprises a succession of parallel rollers 12—12a—12b whose axes are in an inclined plane with respect to the horizontal. These rollers have a speed increasing from roller 12 to the last roller. They communicate a progressively increasing speed to the fibers, which has the effect of separating the spirals from one another and assuring the drawing-out of the fibers, which leads to obtaining a uniform cord or wick 11, which can then be wound on a bobbin, (not shown), placed at the end of the rollers.

Figure 2:
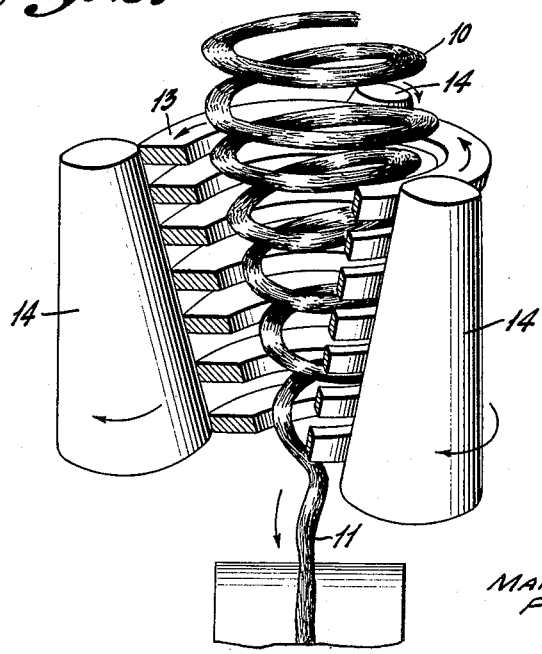
FIG. 2 is a perspective view, with some parts cut away, of a different arrangement for transforming the spirals of fibers which are discharged below the centrifuge, as indicated in FIG. 1, into a continuous straight length of thread for winding onto a bobbin.

In the form of execution shown in FIG. 2, the device comprises a succession of separate parallel rings 13 whose axes coincide with that of the rotary centrifuge and which form, inside as well as out, a truncated cone surface. These rings are rotated by means of three truncated rollers 14 acting both as the rotating means as well as the support for the rings 13. By virtue of this arrangement, the angular speed of each ring is different and increases from top to bottom. The spirals 10 formed by the fibers separate more and more, and at the bottom they form a uniform cord or wick 11 which may be wound upon a bobbin.

FIG. 3 shows another form of execution. The drive for the centrifuge 1 is shown in greater detail in this figure than in FIG. 1. The upper hollow shaft 17 of the centrifuge is rotatably mounted within the cooled support 20 of frame F by means of upper and lower sets of roller or ball bearings 18 and 19, respectively. A multiple-sheave pulley 23 is affixed to the upper end of the shaft 17 of the centrifuge. The electric motor 21, mounted in the upper portion of the frame F is fitted with a drive pulley 22, and belts 24 transmit the rotary motion from pulley 22 on the motor shaft to the pulley 23 on the centrifuge shaft. A stream 25 of molten viscous material, such as molten glass, is supplied to the distributor D which may be mounted in the interior of the centrifuge and which may be rotatable therewith. The molten material is projected by centrifugal force in filamentary form from a plurality of orifices in the peripheral wall of the distributor for depositing a film of substantially uniform thickness on the inner face of the peripheral wall 2 of the centrifuge 1. Such an arrangement is described in detail in assignee's French Patent No. 1,124,488 or Australian Patent No. 205,437. The filaments of molten glass are projected from the several rows of orifices 2' in the peripheral wall of the centrifuge for drawing-out and discharge, as explained in conjunction with the embodiment shown in FIG. 1. Conduit 26 feeds the necessary combustible mixture into the combustion chamber 3 for generating the attenuating gases of high temperature and velocity.

In this embodiment there is provided a rotating drum of truncated form 15 for disposing of the wick 10. This drum is positioned vertically below the rotary centrifuge and coaxially therewith. The upper face 15a of the drum 15 is smaller than the base 15b which is mounted on a circular plate 16 having a greater diameter than that of the base 15b. This drum communicates to the wick or thread of fibers an increasing speed, and as in the preceding devices, a uniform cord 11 is obtained which may be led therefrom for winding upon a bobbin.

Figure 4:
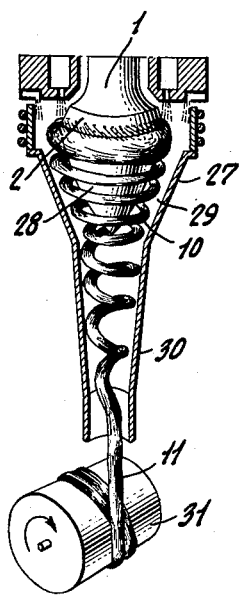
FIG. 4 is a vertical sectional view of a conduit arrangement below the centrifuging apparatus for effecting a progressive tightening of the spirals of fibers and the ultimate winding of the wick of fibers onto a winding bobbin.

In the form of execution shown in FIG. 4, the device according to the invention is of the pneumatic type. It comprises a truncated casing 27 disposed coaxially with the rotary centrifuge. The centrifuge itself includes a cap 28 of general conic form, the ensemble thus forming a chamber 29, the section of which decreases progressively from top to bottom. A conduit 30, the cross-section of which also decreases progressively, is connected to the outlet of casing 27. Since the cross-section offered to the passage of the gases decreases progressively, their speed increases, and the result is an acceleration of the spirals and the formation of a uniform cord 11 which may then be wound onto a bobbin 31.

Casing 27 and conduit 30 may be cooled by circulation of air or water.

Figure 5:
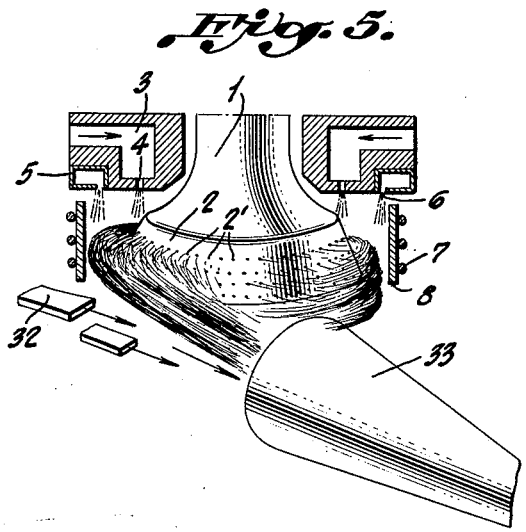
FIG. 5 is a vertical sectional view of the lower end of the centrifuging machine illustrating a pneumatic arrangement for directing the spiral of fibers into a tapered conduit to cause the progressive acceleration thereof.

FIG. 5 shows an arrangement according to which the fibers are subjected to the action of air blowers 32 which evacuate the fibers in a passage 33 of decreasing section.

Figure 6:
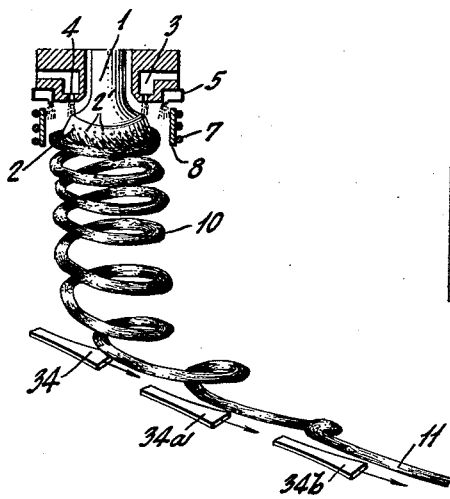
FIG. 6 is a perspective view, with certain parts in section, illustrating a pneumatic arrangement for tightening and ultimately eliminating the spirals of fibers by a progressive acceleration of the travel thereof beyond the centrifuge.

In the embodiment shown in FIG. 6, a succession of air blowers 34—34a—34b are provided, arranged along an inclined plane with respect to the horizontal. These blowers form a curtain of air which supports the fibers and produce currents of increasing speed that assure the separation of the spirals and the formation of a uniform cord or wick 11.

FIG. 7 shows another form of execution which comprises a chamber 35 placed under the rotary centrifuge 1 and co-axially therewith. The inner wall 36 of this chamber is provided with perforations 37 along different levels thereof, which may be annular in form, as illustrated. A conduit 38 extends from the chamber to the intake of a ventilator or any other means creating a low pressure or vacuum to place the interior of chamber 35 under a correspondingly low pressure. The fibers come in contact with wall 36 under the action of the low pressure at the same time that the gases are evacuated through perforations 37 and chamber 35.

Also, under chamber 35 and along its axis, are provided crowns or annular rings 39 whose inner diameters decrease progressively from one to another, leaving between them a slight space. An ejector 40, fed by compressed air, is positioned below the last ring 39. This ejector creates a strong vacuum which sucks in the fibers which are restrained or braked by their contact with wall 36. The fibers slip through the stack of rings 39, assuming progressively increasing speeds, while currents of induced air enter through the spaces between the rings under the effect of the low pressure created by the ejector. The fibers leave the ejector in the form of a uniform cord or wick 11.

In the embodiment shown in FIG. 8, the fiber spirals 10 are received in a basket funnel 41 located under the rotary centrifuge. This funnel preferably has a truncated form, with its large section forming the upper part. Air blowers 42 are provided on the wall of this funnel, and these are placed along several parallel rows. The exit speed of the air across the blowers increases from the first row to the last, which gives the fibers a progressively increasing speed from the entrance into the funnel to the exit, this action being increased by the decreasing section of the funnel. A conduit 43, also of decreasing section, may be connected to funnel 41, from which the fibers leave in the form of a cord 11 which may be wound on a bobbin 44.

We claim:

1. A method of manufacture of wicks or threads from fibers of thermoplastic material produced by the projection of the material through the orifices in the peripheral wall of a rapidly rotating hollow body, which comprises forming the fibers in successive continuous spirals, and continuously accelerating the speed of the fibers beyond their point of formation until the spirals of fibers are transformed into a continuous length of thread.

2. A method of manufacture of wicks or threads from fibers of thermoplastic material produced by the projection of the material through the orifices in the peripheral wall of a rapidly rotating hollow body, which comprises forming the fibers in successive continuous spirals, and pulling the spirals of fibers mechanically to impart a continuously increasing speed thereto beyond their point of formation until the fibers are transformed into a continuous length of thread.

3. A method of manufacture of wicks or threads from fibers of thermoplastic material produced by the projection of the material through the orifices in the peripheral wall of a rapidly rotating hollow body, which comprises forming the fibers in successive continuous spirals, and pulling the spirals of fibers pneumatically to impart a continuously increasing speed thereto beyond their point of formation until the fibers are transformed into a continuous length of thread.

4. An apparatus of the class described in combination with a hollow rotary centrifuge having a peripheral wall with a plurality of rows of orifices therein adapted to have molten thermoplastic material projected therethrough and attenuated by a transversely directed gaseous blast to produce successive spirals of fibers, means for removing the spirals of fibers from the centrifuge, and means for accelerating the travel of the fibers progressively beyond the centrifuge to effect the ultimate elimination of the spirals and the transformation of the fibers into a continuous wick or thread.

5. An apparatus of the class described in combination with a hollow centrifuge rotatable about a vertical axis and provided with a peripheral wall having a plurality of rows of orifices therein adapted to have molten thermoplastic material projected therethrough and attenuated by a transversely directed gaseous blast to produce successive spirals of fine fibers, means for evacuating the spirals of fibers from below the centrifuge, and means for accelerating the travel of the fibers progressively beyond the centrifuge to effect the ultimate elimination of the spirals and the transformation of the fibers into a continuous wick or thread of fine fibers.

6. An apparatus as set forth in claim 5 wheren said last-mentioned means consists of mechanical devices.

7. An apparatus of the class described in combination with a hollow centrifuge rotatable about a vertical axis and provided with a peripheral wall having a plurality of rows of orifices therein adapted to have molten thermoplastic material projected therethrough and attenuated by a transversely directed gaseous blast to produce successive spirals of fine fibers, means for removing the spirals of fibers from below the centrifuge, and means below the centrifuge and co-axial therewith for accelerating the travel of the fibers progressively to effect the ultimate elimination of the spirals and the transformation of the fibers into a continuous wick or thread of fine fibers.

8. An apparatus as set forth in claim 7 wherein said last-mentioned means comprises at least one rotary body for drawing out the successive spirals into a continuous length of thread as the spirals drop from the centrifuge.

9. An apparatus as set forth in claim 8 wherein said rotary body is a frustum of a cone with an enlarged base, and a rotary circular plate supporting said cone wherefrom the spirals are led in the form of a straight continuous length of thread.

10. An apparatus as set forth in claim 7 wherein said last-mentioned means comprises a plurality of spaced superposed annular rings, means for imparting successively increasing speeds to the successive downwardly disposed rings as spirals of fibers come into contact with the inner diameters thereof to effect a gradual tightening of the spirals and their ultimate elimination.

11. An apparatus of the class described in combination with a hollow centrifuge rotatable about a vertical axis and provided with a peripheral wall having a plurality of rows of orifices therein adapted to have molten thermoplastic material projected therethrough and attenuated by a transversely directed gaseous blast to produce successive spirals of fibers, means for removing the spirals of fibers from the centrifuge, and pneumatic means for accelerating the travel of the fibers progressively beyond the centrifuge to effect the ultimate elimination of the spirals and the transformation of the fibers into a continuous wick or thread.

12. An apparatus as set forth in claim 11 including a conical cap extending from the lower end of the centrifuge, a truncated conical casing surrounding said cap, and a conduit of decreasing cross-section extending downwardly from said casing for guiding said spirals of fibers as they drop below the centrifuge.

13. An apparatus as set forth in claim 11 wherein said last-mentioned means comprises a conduit of decreasing cross-section disposed laterally of the bottom of the centrifuge and blowing means for directing the spirals of fibers as they emerge beyond the bottom of the centrifuge into the large end of said conduit.

14. An apparatus as set forth in claim 11 wherein said last-mentioned means comprises a frusto-conical receptor for the spirals of fibers disposed below and co-axially with the centrifuge, and blowing means cooperating with said receptor to effect a gradual tightening of the spirals of fibers preparatory to their ultimate conversion to a straight continuous length of thread.

15. An apparatus as set forth in claim 14 wherein said receptor is provided with a surrounding chamber, means for maintaining said chamber at a reduced pressure, and a plurality of openings in the receptor wall at different levels thereof to subject the successive spirals of fibers as they travel down in said receptor to the reduced pressure within said chamber.

16. An apparatus as set forth in claim 15 including a plurality of annular rings below the reduced end of the receptor and co-axially therewith, said rings being arranged with gradually reduced internal openings from the top to the bottom thereof, and an ejector disposed below the lowermost ring to pull the straight continuous length of thread downwardly as the same emerges from the gradually tightened spirals.

References Cited in the file of this patent

UNITED STATES PATENTS

| | | |
|---|---|---|
| 2,431,205 | Slayter | Nov. 18, 1947 |
| 2,863,493 | Snow et al. | Dec. 9, 1958 |

FOREIGN PATENTS

| | | |
|---|---|---|
| 1,207,839 | France | Feb. 18, 1960 |
| 716,917 | Germany | Feb. 2, 1942 |
| 266,857 | Switzerland | May 16, 1950 |